United States Patent
Jang

[11] Patent Number: 5,365,635
[45] Date of Patent: Nov. 22, 1994

[54] RETRACTABLE CASTER ASSEMBLY

[76] Inventor: Shis-Wen Jang, No.7, Alley 73, Lane 81, Tung-Lai Rd., Ho-Mei Chen, Chang-Hua Hsien, Taiwan, Prov. of China

[21] Appl. No.: 102,006

[22] Filed: Aug. 4, 1993

[51] Int. Cl.$^5$ .............................................. B60B 33/06
[52] U.S. Cl. .......................................................... 16/34
[58] Field of Search ................... 16/34, 30, 32, 19, 44, 16/29

[56] References Cited

U.S. PATENT DOCUMENTS

| | | | |
|---|---|---|---|
| 4,097,955 | 7/1978 | Foge et al. | 16/34 |
| 4,335,896 | 6/1982 | Koffler et al. | 16/30 |
| 4,397,062 | 8/1983 | Huang | 16/34 |
| 4,772,035 | 9/1988 | Danial | 16/30 |
| 4,773,123 | 9/1988 | Yu | 16/34 |
| 5,154,265 | 10/1992 | Capistrant | 16/34 |
| 5,253,389 | 10/1993 | Colin | 16/34 |

FOREIGN PATENT DOCUMENTS

| | | | |
|---|---|---|---|
| 121060 | 1/1931 | Austria | 16/34 |
| 550044 | 10/1956 | Italy | 16/34 |
| 688585 | 10/1979 | U.S.S.R. | 16/34 |

OTHER PUBLICATIONS

IBM Technical Disclosure Bulletin vol. 26 No. 7A Dec. 1983.

*Primary Examiner*—P. Austin Bradley
*Assistant Examiner*—Chuck Y. Mah
*Attorney, Agent, or Firm*—Birch, Stewart, Kolasch & Birch

[57] ABSTRACT

A retractable caster assembly includes a mounting unit and a foot unit. The mounting unit has a horizontal mounting plate and a hollow connector which projects downwardly from the mounting plate and which is formed with an outward stop projection and a slot immediately below the stop projection. The foot unit has a foot portion, a connecting shaft extending upwardly from the foot portion into an open lower end of the hollow connector, and a horizontal retaining plate extending from one side of the connecting shaft. The foot unit is mounted slidably to the hollow connector and is movable between a first position, wherein the retaining plate extends out of the slot of the hollow connector, and a second position, wherein the retaining plate is retracted into the hollow connector. A base plate is mounted pivotally to the mounting plate adjacent to the hollow connector and is movable between a released position, wherein the base plate is disposed away from the hollow connector, and a retained position, wherein the base plate has an edge portion retained between the stop projection and the retaining plate. A caster unit is mounted on the base plate and extends lower than the foot portion when the base plate is in the retained position. The caster unit is disposed at a level higher than the foot portion when the base plate is in the released position.

5 Claims, 7 Drawing Sheets

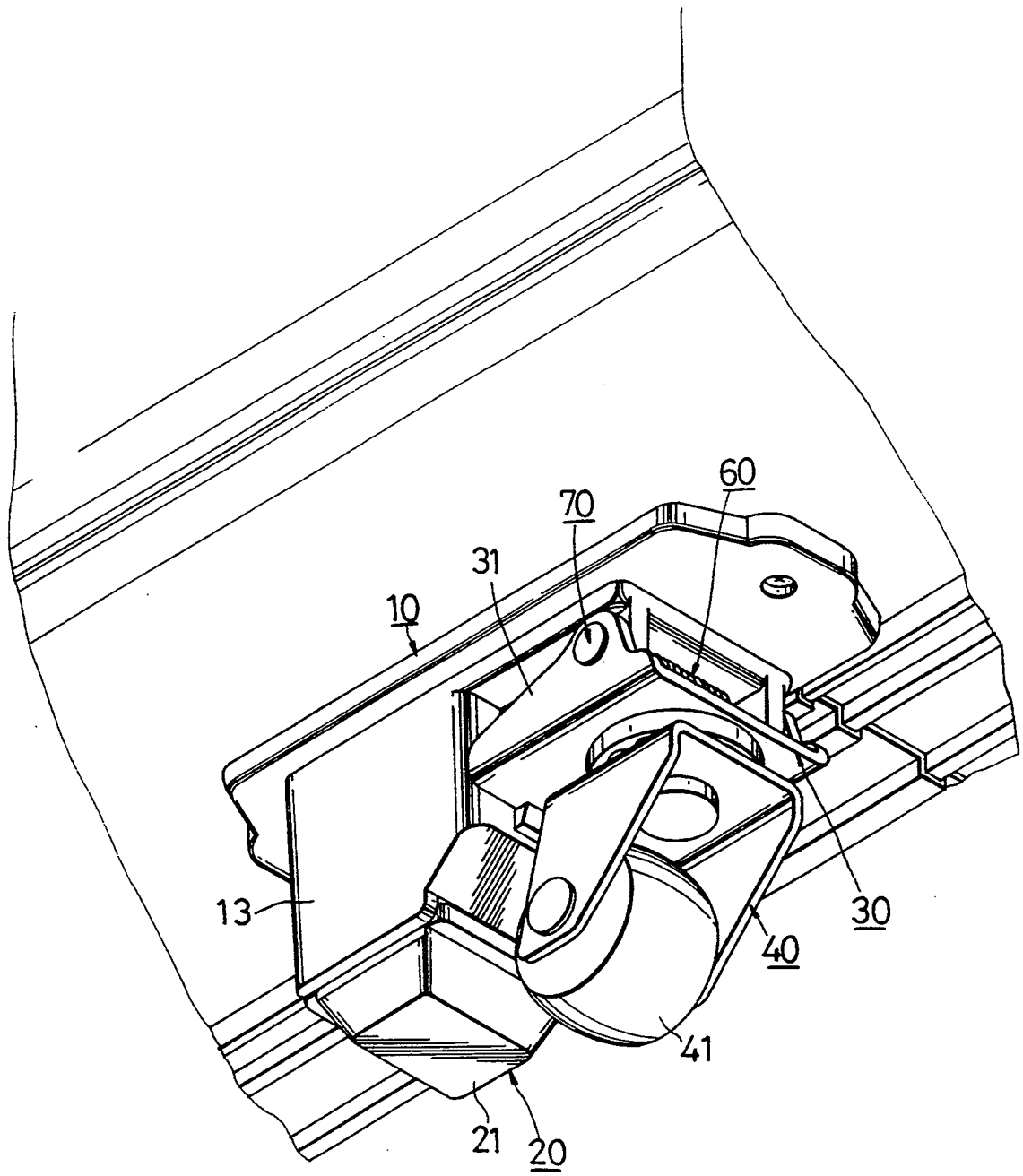
F I G. 4

RETRACTABLE CASTER ASSEMBLY

BACKGROUND OF THE INVENTION

1. Field of the Invention

The invention relates to a caster assembly, more particularly to a retractable caster assembly for a suitcase.

2. Description of the Related Art

A conventional suitcase is usually provided with four caster units, two of which are capable of 360° rotation. When the conventional suitcase is placed on a conveyor mechanism, such as in airports, toppling of the conventional suitcase occurs, especially when the latter contains a heavy load, because no means are employed to arrest undesired movement of the caster units, thereby resulting in breakage of fragile items inside the suitcase.

FIGS. 1 and 2 illustrate a conventional caster assembly for a suitcase 1. The caster assembly includes a mounting plate 2 secured to a bottom side of the suitcase 1. The mounting plate 2 has a bottom face which is provided with a resilient strip 3. The resilient strip 3 has a distal hook portion (3a). The bottom face of the mounting plate 2 is further provided with a pair of slide grooves (2a) disposed on opposite sides of the resilient strip 3. A caster unit 4 has a base plate 5 that is mounted removably on the mounting plate 2 by extending portions of the former into the slide grooves (2a) of the latter. The hook portion (3a) of the resilient strip 3 retains the base plate 5 on the mounting plate 2 releasably. In order to avoid toppling of the suitcase 1 when the latter is placed on a conveyor mechanism, the caster unit 4 is detached from the mounting plate 2, and a foot unit 6 (shown in phantom lines) is then mounted removably on the mounting plate 2 by extending portions of the former into the slide grooves (2a) of the latter.

Although the above described caster assembly can help avoid toppling of the suitcase when the latter is placed on a conveyor mechanism, frequent removal of the caster unit 4 and replacement of the same by the foot unit 6 can inconvenience the user.

SUMMARY OF THE INVENTION

Therefore, the objective of the present invention is to provide a retractable caster assembly which can be operated conveniently and which obviates the need for removing a caster unit and replacing the same with a foot unit when the caster unit is not in use.

Accordingly, the retractable caster assembly of the present invention comprises:

a mounting unit including a horizontal mounting plate and a hollow connector which projects downwardly from the mounting plate, the hollow connector having an open lower end and being formed with an outward stop projection and a slot immediately below the stop projection;

a foot unit having a foot portion, a connecting shaft extending upwardly from the foot portion into the hollow connector via the open lower end, and a horizontal retaining plate extending from one side of the connecting shaft, the foot unit being mounted slidably to the hollow connector and being movable between a first position, wherein the retaining plate extends out of the slot of the hollow connector, and a second position, wherein the retaining plate is retracted into the hollow connector;

a first biasing means disposed inside the hollow connector for biasing the foot unit towards the first position;

a base plate mounted pivotally to the mounting plate adjacent to the hollow connector and movable between a released position, wherein the base plate is disposed away from the hollow connector, and a retained position, wherein the base plate has an edge portion retained between the stop projection and the retaining plate;

a second biasing means for biasing the base plate toward the released position; and a caster unit mounted on the base plate, the caster unit extending lower than the foot portion when the base plate is in the retained position, the caster unit being disposed at a level higher than the foot portion when the base plate is in the released position.

BRIEF DESCRIPTION OF THE DRAWINGS

Other features and advantages of the present invention will become apparent in the following detailed description of the preferred embodiment, with reference to the accompanying drawings, of which:

FIG. 4 is a perspective view illustrating the preferred embodiment when mounted on a bottom side of a suitcase;

DETAILED DESCRIPTION OF THE PREFERRED EMBODIMENT

Figure 1:
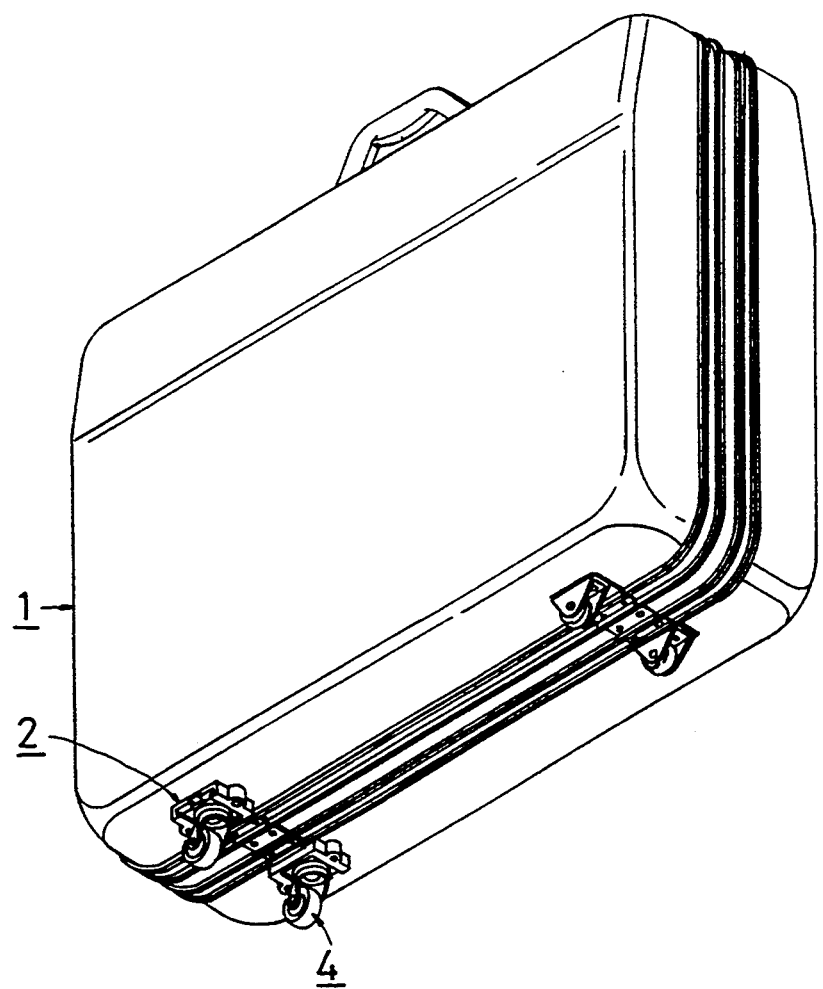
FIG. 1 is a perspective view of a suitcase which incorporates a pair of conventional caster assemblies.
Figure 2:
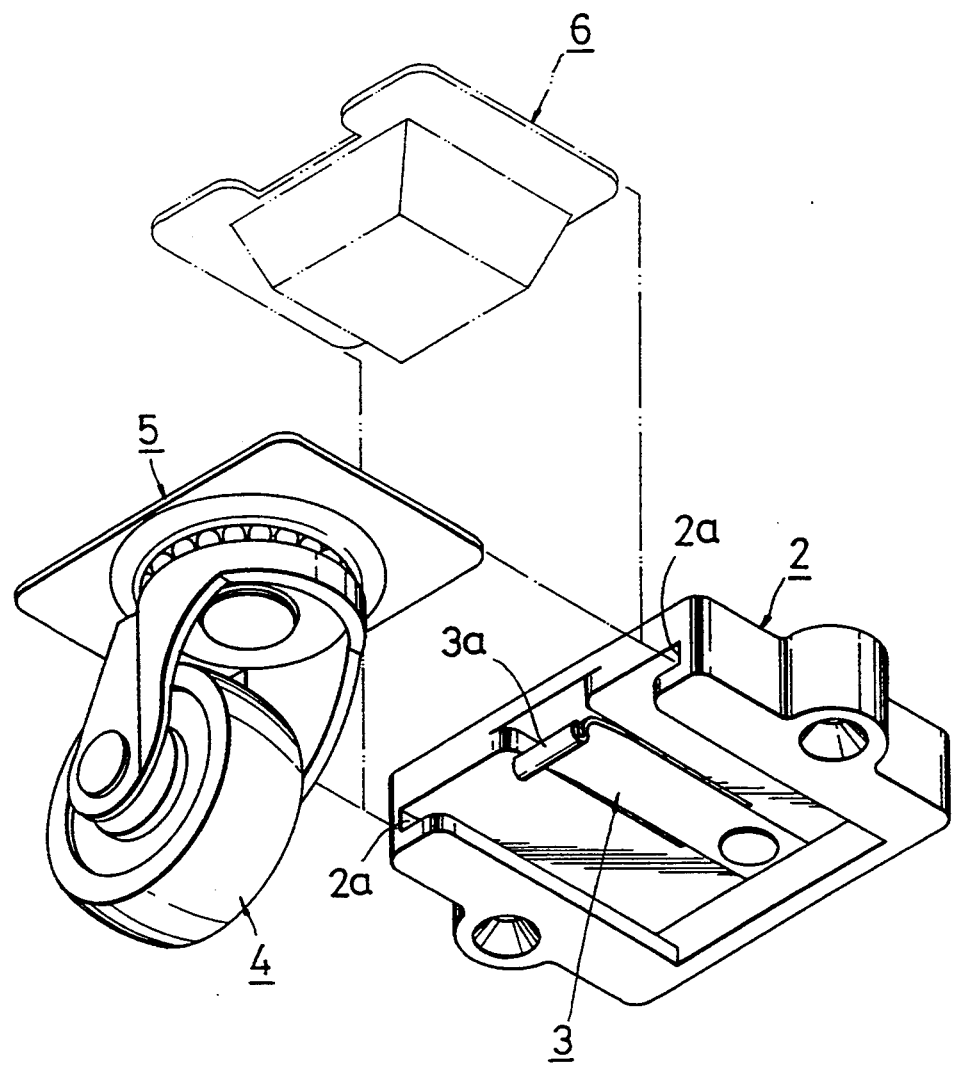
FIG. 2 is an exploded perspective view of one of the caster assemblies shown in FIG. 1.
Figure 3:
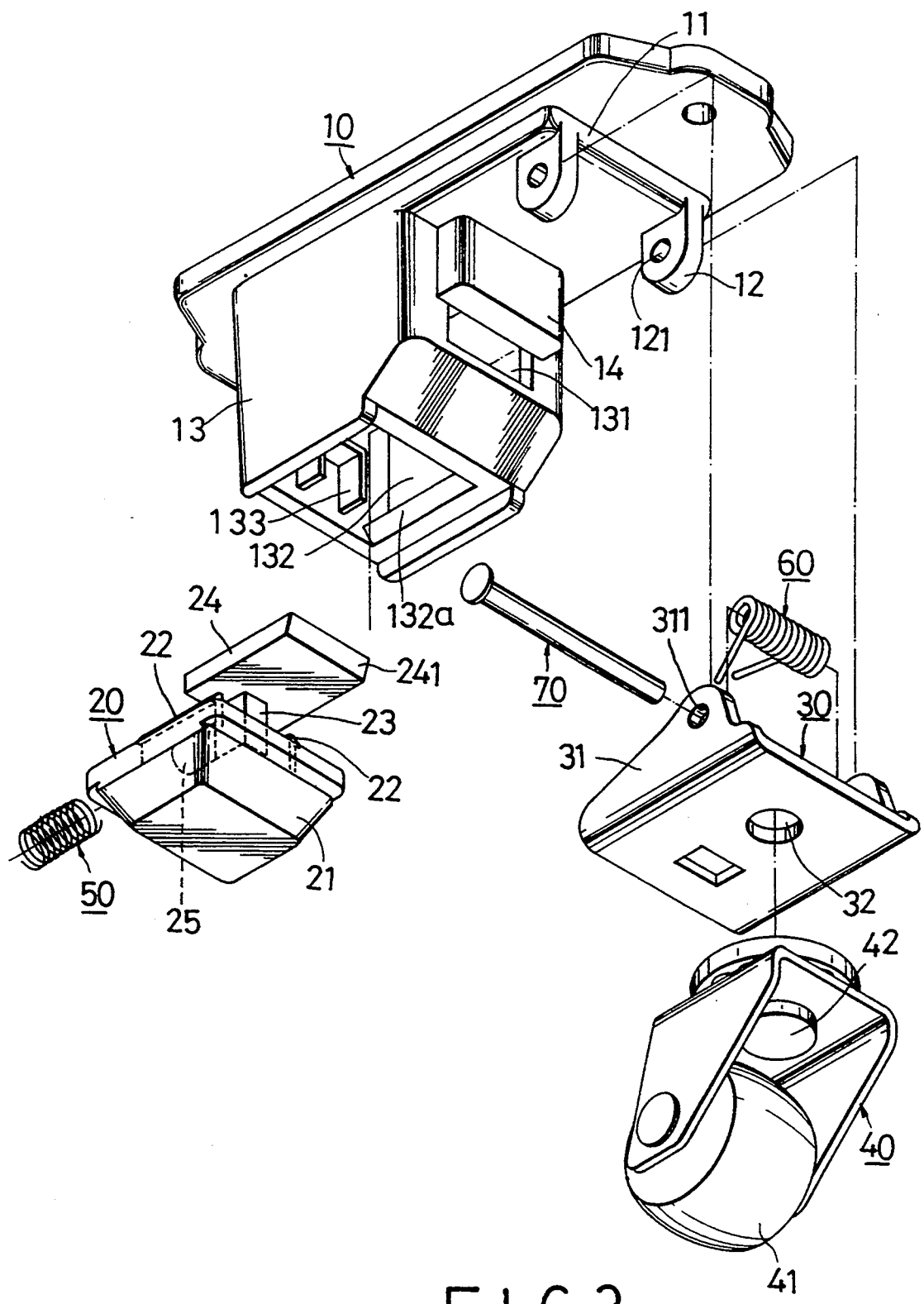
FIG. 3 is an exploded view of the preferred embodiment of a retractable caster assembly according to the present invention.

Referring to FIG. 3, the preferred embodiment of a retractable caster assembly according to the present invention is shown to comprise a mounting unit 10, a foot unit 20, a base plate 30 and a caster unit 40.

The mounting unit 10 is an integrally molded piece and is adapted to be secured to a bottom side of a suitcase. The mounting unit 10 includes a horizontal mounting plate 11 and a spaced pair of pivot lugs 12 which project downwardly from a bottom face of the mounting plate 11 at a right portion of the same. The pivot lugs 12 are formed with aligned first holes 121. The mounting unit 10 further includes a hollow connector 13 which projects downwardly from the bottom face of the mounting plate 11 at a left portion of the same. In this embodiment, the hollow connector 13 is a hollow rectangular casing and has a first side wall which is adjacent to the pivot lugs 12 and which is formed with an outward stop projection 14. The hollow connector 13 has an open lower end 132 and a slot 131 formed in the first side wall immediately below the stop projection 14. The hollow connector 13 further has a second side wall which is opposite to the first side wall and which has an inner wall surface that is formed with an inverted U-shaped positioning frame 133, and opposing third and fourth side walls which interconnect the first and second side walls. The third and fourth side walls are formed with inwardly extending horizontal slide rails (132a) adjacent to the open lower end 132 of the hollow connector 13. The slide rails (132a) have inclined distal edges.

The foot unit 20 extends into the hollow connector 13 via the open lower end 132. The foot unit 20 has a foot portion 21 and a spaced pair of oppositely oriented hook members 22 which extend upwardly from a top surface of the foot portion 21. The length of the hook members 22 is smaller than that of the open lower end 132 of the hollow connector 13 to permit sliding movement of the foot unit 2 relative to the hollow connector 13. A connecting shaft 23 extends upwardly from the top surface of the foot portion 21 between the hook members 22. A horizontal retaining plate 24 extends from the right side of a top end of the connecting shaft 23 and preferably has a tapered distal end 241 and a thickness which is equal to one-half of the height of the slot 131. A support pin 25 extends from the left side of the connecting shaft 23. A spring 50, such as a coil spring, is disposed around the support pin 25 and is longer than the same.

The base plate 30 is a rectangular plate with two opposite upwardly extending sides 31 that are formed with aligned second holes 311. The space between the sides 31 of the base plate 30 is preferably wider than that between the pivot lugs 12. A pivot pin 70 extends through the aligned first and second holes 121, 311 in the pivot lugs 12 and in the sides 31 of the base plate 30 to mount pivotally the base plate 30 on the mounting plate 11. A torsion spring 70 is disposed around the pivot pin 70 between the pivot lugs 12, as best illustrated in FIG. 4. The base plate 30 is further formed with a mounting hole 32. A rivet 42 extends into the mounting hole 32 and mounts the caster unit 40 on the base plate 30. The caster unit 40 is preferably capable of 360° rotation.

Assembly of the preferred embodiment is as follows: After the caster unit 40 has been mounted on the base plate 30, the second holes 311 in the sides 31 of the base plate 30 are aligned with the first holes 121 in the pivot lugs 12. The pivot pin 70 extends through the hole 311 in one of the sides 31, the hole 121 in one of the pivot lugs 12, and further extends through the torsion spring 60. The pivot pin 70 is then extended through the hole 311 in the other one of the sides 31 and the hole 121 in the other one of the pivot lugs 12, thereby mounting pivotally the base plate 30 on the mounting plate 11.

Figure 5:
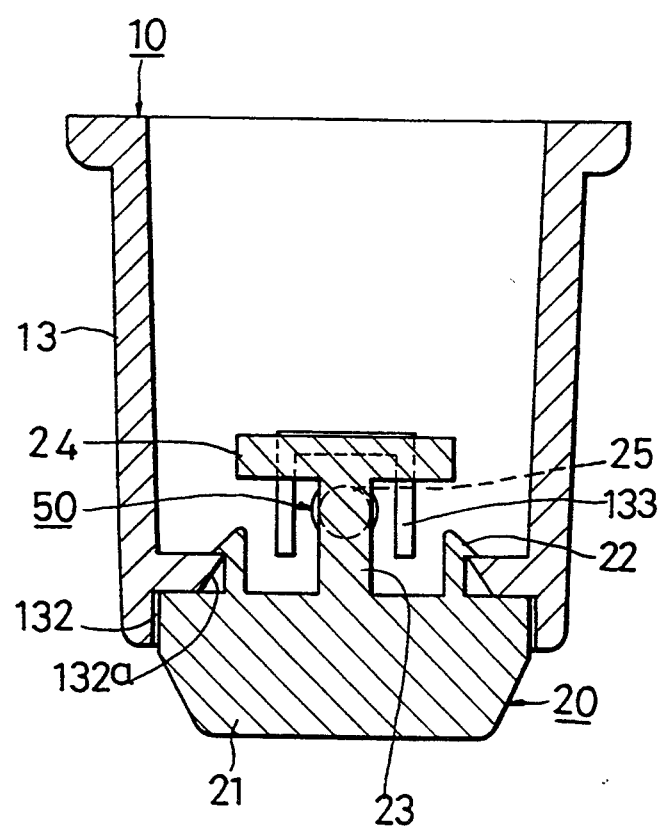
FIG. 5 is a sectional view which illustrates a mounting unit and a foot unit of the preferred embodiment.

The spring 50 is provided around the support pin 25, and the retaining plate 24 is extended into the hollow connector 13 via the open lower end 132 of the latter so that the distal end 241 thereof can extend out of the slot 131 in the hollow connector 13. As the retaining plate 24 is extended into the hollow connector 13, the hook members 22 on the foot portion 21 move upwardly past the inclined distal edges of the slide rails (132a) so as to engage the latter, as best illustrated in FIG. 5. At this stage, the spring 50 extends into the space confined by the positioning frame 133, thereby completing the assembly of the preferred embodiment.

Figure 6:
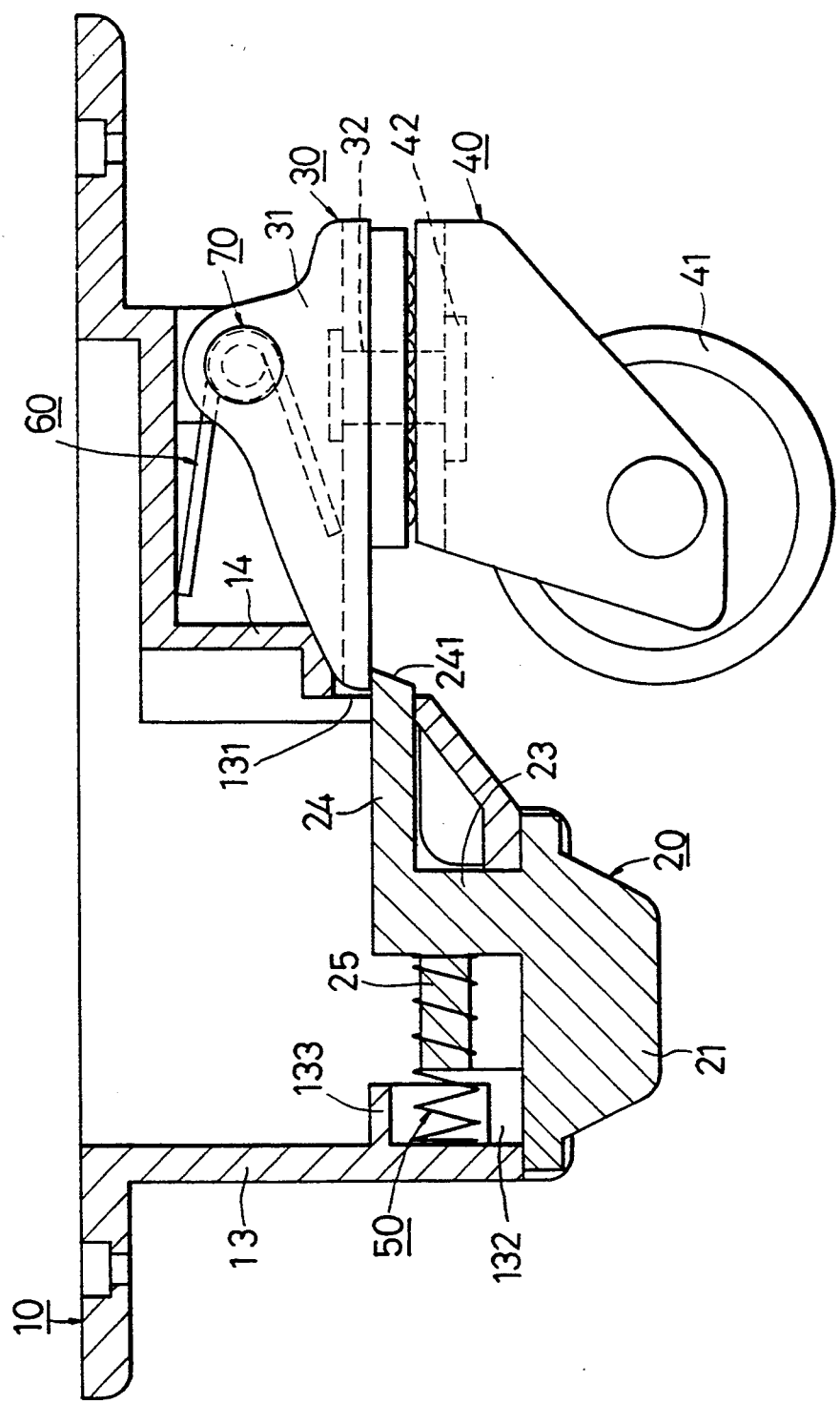
FIG. 6 is a partly sectional schematic view of the preferred embodiment when in a first operating state.

FIG. 6 illustrates the preferred embodiment when in a first operating state. When it is desired to permit contact between the caster unit 40 and the ground, the base plate 30 is pivoted toward the hollow connector 13. Note that the two ends of the torsion spring 60 abut the mounting plate 11 and the base plate 30, respectively. Thus, the torsion spring 60 is wound when the base plate 30 is pivoted toward the hollow connector 13. Continued pivoting movement of the base plate 30 in this direction eventually causes an edge portion of the base plate 30 to abut the distal end 241 of the retaining plate 24. The retaining plate 24 shifts slightly to the left, thereby compressing the spring 50, in order to permit the edge of the base plate 30 to move past the distal end 241 of the retaining plate 24. After the edge portion of the base plate 30 has moved past the distal end 241 of the retaining plate 24, the spring 50 expands to return the retaining plate 24 to its former position. The edge portion of the base plate 30 is retained between the distal end 241 of the retaining plate 24 and the stop projection 14 at this stage. The caster unit 40 extends lower than the foot portion 21, thereby permitting contact between the caster unit 40 and the ground.

Figure 7:
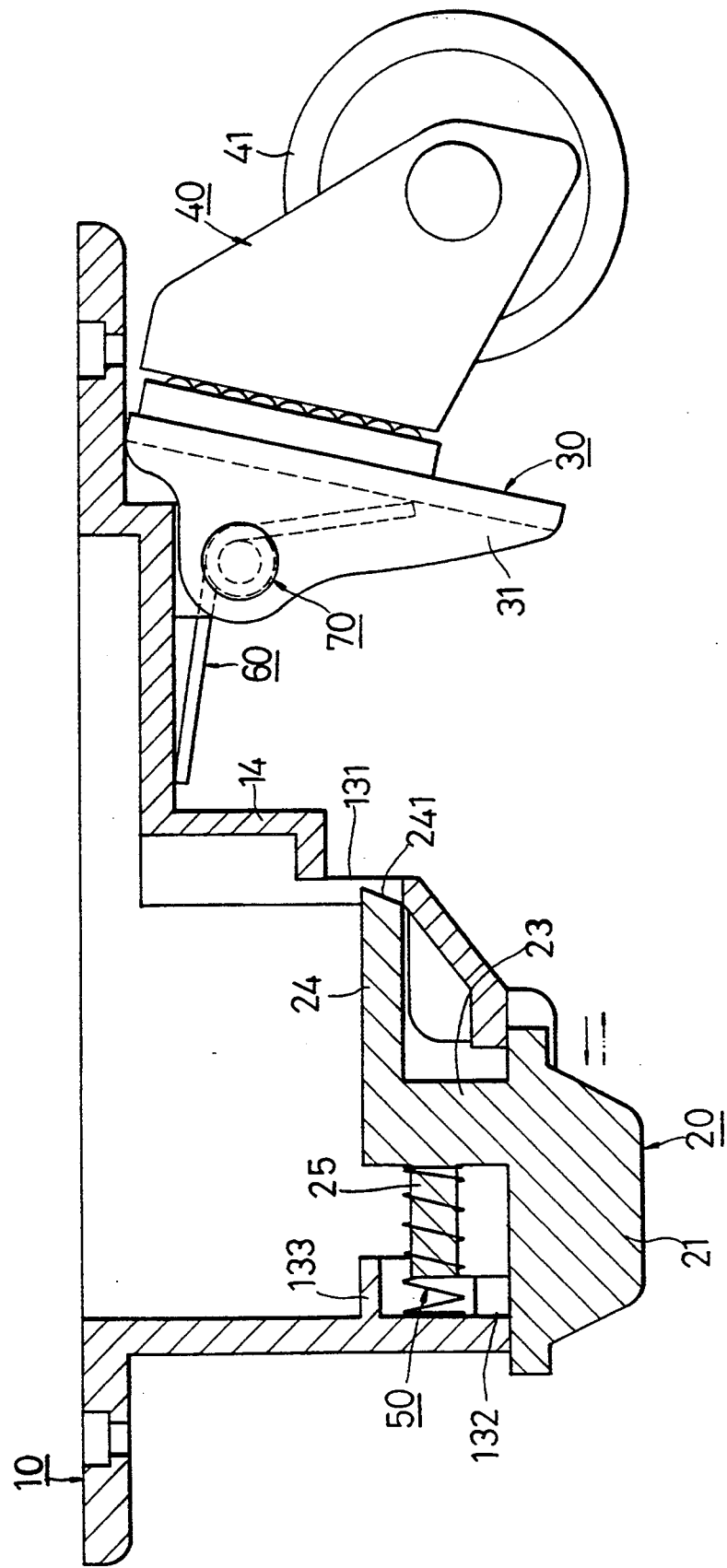
FIG. 7 is a partly sectional schematic view of the preferred embodiment when in a second operating state.

FIG. 7 illustrates the preferred embodiment when in a second operating state. When it is desired to prevent contact between the caster unit 40 and the ground, the foot portion 21 is shifted manually to the left in order to compress the spring 50 and to retract the distal end 241 of the retaining plate 24 into the hollow connector 13. The torsion spring 60 unwinds in order to allow pivoting movement of the base plate 30 away from the hollow connector 13. The caster unit 40 is disposed at a level which is higher than the foot portion 21, thereby preventing contact between the caster unit 40 and the ground.

When a suitcase which employs the retractable caster assembly of the present invention is placed on a conveyor mechanism or on an inclined surface, toppling and/or undesired movement of the suitcase can be avoided by placing the retractable caster assembly in the second operating state. When the retractable caster assembly is in the second operating state, it is the foot portion 21, and not the caster unit 40, which is in contact with the ground, thereby permitting stable positioning of the suitcase on the latter.

It has thus been shown that the retractable caster assembly of the present invention can be operated conveniently and obviates the need for removing the caster unit and replacing the same with a foot unit when the caster unit is not in use. The objective of the present invention is thus achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A retractable caster assembly, comprising:
a mounting unit including a horizontal mounting plate and a hollow connector which projects downwardly from said mounting plate, said hollow connector having an open lower end and a first side wall that is formed with an outward stop projection and a slot immediately below said stop projection;
a foot unit having a foot portion, a connecting shaft extending upwardly from said foot portion into said hollow connector via said open lower end, and a horizontal retaining plate extending from one side of said connecting shaft, said foot unit being mounted slidably to said hollow connector and being movable between a first position, wherein said retaining plate extends out of said slot of said hollow connector, and a second position, wherein said retaining plate is retracted into said hollow connector;

a first biasing means disposed inside said hollow connector for biasing said foot unit towards said first position;

a base plate mounted pivotally to said mounting plate adjacent to said first side wall of said hollow connector and movable between a released position, wherein said base plate is disposed away from said hollow connector, and a retained position, wherein said base plate has an edge portion retained between said stop projection and said retaining plate;

a second biasing means for biasing said base plate toward said released position; and a caster unit mounted on said base plate, said caster unit extending lower than said foot portion when said base plate is in said retained position, said caster unit being disposed at a level higher than said foot portion when said base plate is in said released position.

2. The retractable caster assembly as claimed in claim 1, wherein:

said hollow connector has a second side wall opposite to said first side wall and opposing third and fourth side walls interconnecting said first and second side walls, said third and fourth side walls being formed with inwardly extending horizontal slide rails adjacent to said open lower end of said hollow connector; and said foot unit has a spaced pair of oppositely oriented hook members which extend upwardly from said foot portion, said hook members engaging said slide rails of said hollow connector to mount slidably said foot unit to said hollow connector.

3. The retractable caster assembly as claimed in claim 1, wherein:

said second side wall of said hollow connector has an inner wall surface that is formed with an inverted U-shaped positioning frame;

said foot unit has a support pin which extends from said connecting shaft in a direction toward said second side wall; and said first biasing means is a coil spring which is disposed around said support pin and which extends into said positioning frame of said second side wall.

4. The retractable caster assembly as claimed in claim 1, wherein:

said mounting unit further includes a spaced pair of pivot lugs which project downwardly from said mounting plate adjacent to said first side wall of said hollow connector and which are respectively formed with aligned first holes;

said base plate has two opposite upwardly extending sides which are respectively formed with aligned second holes; and said mounting unit further includes a pivot pin which extends through said aligned first and second holes to mount pivotally said base plate on said mounting plate.

5. The retractable caster assembly as claimed in claim 4, wherein said second biasing means is a torsion spring which is disposed around said pivot pin and which has two ends that abut said mounting plate and said base plate, respectively.

* * * * *